United States Patent
Freestone

(10) Patent No.: US 11,286,062 B1
(45) Date of Patent: Mar. 29, 2022

(54) SPACECRAFT EXOSKELETON TRUSS STRUCTURE

(71) Applicant: Space Systems/Loral, LLC, Palo Alto, CA (US)

(72) Inventor: Michael Paul Freestone, El Granada, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 417 days.

(21) Appl. No.: 16/539,348

(22) Filed: Aug. 13, 2019

Related U.S. Application Data

(63) Continuation-in-part of application No. 15/336,541, filed on Oct. 27, 2016, now Pat. No. 10,407,189.

(51) Int. Cl.
*B64G 1/50* (2006.01)
*B29C 65/48* (2006.01)

(52) U.S. Cl.
CPC .............. *B64G 1/503* (2013.01); *B29C 65/48* (2013.01); *B64G 1/506* (2013.01)

(58) Field of Classification Search
CPC .......... B64G 1/503; B64G 1/506; B64G 1/50; F28D 2021/0021
See application file for complete search history.

(56) References Cited

U.S. PATENT DOCUMENTS

| | | | |
|---|---|---|---|
| 3,386,745 A | 6/1968 | Hein | |
| 3,665,670 A | 5/1972 | Rummler | |
| 3,847,694 A | 11/1974 | Stewing | |
| 3,920,268 A | 11/1975 | Stewing | |
| 4,084,827 A | 4/1978 | Wolf | |
| 4,211,259 A | 7/1980 | Butler | |
| 4,213,619 A | 7/1980 | Arlt et al. | |
| 4,395,004 A | 7/1983 | Ganssle | |

(Continued)

FOREIGN PATENT DOCUMENTS

| CN | 102867101 A | 1/2013 |
|---|---|---|
| CN | 103412997 A | 11/2013 |

(Continued)

OTHER PUBLICATIONS

U.S. Office Action dated Feb. 8, 2018 issued in U.S. Appl. No. 15/053,993.

(Continued)

*Primary Examiner* — Philip J Bonzell
(74) *Attorney, Agent, or Firm* — Weaver Austin Villeneuve & Sampson LLP

(57) ABSTRACT

A spacecraft includes a structural interface adapter for mating to a launch vehicle, at least one radiator panel, at least one equipment panel, a first 3-D truss structure proximal to and mechanically coupled with the structural interface adapter, and a second 3-D truss structure distal from the structural interface adapter and coupled mechanically with the structural interface adapter by way of the first 3-D truss structure. The at least one equipment panel and the at least one exterior radiator panel is coupled mechanically by one or both of the first 3-D truss structure and the second 3-D truss structure with the structural interface adapter. Each 3-D truss structure includes at least four coupling nodes and at least six strut elements, attached together by a respective plurality of joints, each strut element disposed between and attached with a respective pair of the plurality of coupling nodes.

16 Claims, 9 Drawing Sheets

(56) References Cited

U.S. PATENT DOCUMENTS

| | | |
|---|---|---|
| 4,451,017 A | 5/1984 | Marshall |
| 4,527,362 A | 7/1985 | Tobey et al. |
| 4,612,750 A | 9/1986 | Maistre |
| 4,624,599 A | 11/1986 | Piasecki |
| 4,637,193 A | 1/1987 | Lange |
| 4,697,767 A | 10/1987 | Witten et al. |
| 4,801,159 A | 1/1989 | Sehorn |
| 4,982,546 A | 1/1991 | Lange |
| 5,094,409 A | 3/1992 | King et al. |
| 5,244,170 A | 9/1993 | Shekher |
| 5,294,078 A | 3/1994 | Gurr et al. |
| 5,613,653 A | 3/1997 | Bombled et al. |
| 5,666,128 A | 9/1997 | Murray et al. |
| 5,667,167 A | 9/1997 | Kistler |
| 5,732,765 A | 3/1998 | Drolen et al. |
| 5,735,489 A | 4/1998 | Drolen et al. |
| 5,743,325 A | 4/1998 | Esposto |
| 5,787,969 A | 8/1998 | Drolen et al. |
| 5,806,800 A | 9/1998 | Caplin |
| 5,806,803 A | 9/1998 | Watts |
| 5,839,696 A | 11/1998 | Caplin et al. |
| 5,961,078 A | 10/1999 | Eberg et al. |
| 6,053,454 A | 4/2000 | Smolik et al. |
| 6,138,951 A | 10/2000 | Budris et al. |
| 6,296,206 B1 | 10/2001 | Chamness et al. |
| 6,513,760 B1 | 2/2003 | Mueller et al. |
| 7,090,171 B2 | 8/2006 | Peck |
| 7,513,462 B1 | 4/2009 | McKinnon et al. |
| 7,922,179 B2 | 4/2011 | Andrick et al. |
| 8,126,684 B2 | 2/2012 | Goel et al. |
| 8,784,998 B2 | 7/2014 | Cap et al. |
| 8,820,684 B2 | 9/2014 | McKinnon et al. |
| 8,855,977 B2 | 10/2014 | Hallquist |
| 8,915,472 B2 | 12/2014 | Aston et al. |
| 8,967,547 B2 | 3/2015 | Wong et al. |
| 9,273,634 B2 | 3/2016 | Bahn |
| 9,352,856 B1 | 5/2016 | Wu |
| 9,512,949 B2 | 12/2016 | Kauppi et al. |
| 9,889,951 B1 | 2/2018 | Wong et al. |
| 10,059,472 B2 | 8/2018 | Yaney |
| 10,112,731 B2 | 10/2018 | Rodrigues et al. |
| 10,227,145 B2 | 3/2019 | Hijmans et al. |
| 10,407,189 B1 | 9/2019 | Freestone et al. |
| 10,633,123 B2 | 4/2020 | Chiang |
| 2002/0149540 A1 | 10/2002 | Munder et al. |
| 2003/0216894 A1 | 11/2003 | Ghaboussi et al. |
| 2004/0128940 A1 | 7/2004 | LaForge |
| 2005/0126106 A1 | 6/2005 | Murphy et al. |
| 2006/0016935 A1 | 1/2006 | Jordan et al. |
| 2008/0078886 A1 | 4/2008 | Foster et al. |
| 2008/0300831 A1 | 12/2008 | Taggart et al. |
| 2010/0005752 A1 | 1/2010 | Hawkins et al. |
| 2011/0108090 A1 | 5/2011 | Lance et al. |
| 2012/0215498 A1 | 8/2012 | Hallquist |
| 2013/0185030 A1 | 7/2013 | Hallquist |
| 2013/0232907 A1 | 9/2013 | Jones, III |
| 2014/0239125 A1 | 8/2014 | Aston et al. |
| 2014/0252744 A1 | 9/2014 | D'Aluisio |
| 2015/0102174 A1 | 4/2015 | Chu |
| 2015/0232205 A1 | 8/2015 | Lively et al. |
| 2015/0353211 A1 | 12/2015 | London et al. |
| 2016/0016229 A1 | 1/2016 | Czinger et al. |
| 2016/0251093 A1 | 9/2016 | Hijmans et al. |
| 2016/0253444 A1 | 9/2016 | Rodrigues et al. |
| 2016/0264264 A1 | 9/2016 | Helmer et al. |
| 2016/0318635 A1 | 11/2016 | Field et al. |
| 2017/0036782 A1 | 2/2017 | Dula |
| 2018/0290771 A1 | 10/2018 | Chiang |

FOREIGN PATENT DOCUMENTS

| | | |
|---|---|---|
| CN | 103863577 A | 6/2014 |
| WO | WO 2015/175892 A1 | 11/2015 |

OTHER PUBLICATIONS

U.S. Notice of Allowance dated Jun. 29, 2018 issued in U.S. Appl. No. 15/053,993.
U.S. Office Action dated Aug. 24, 2017 issued in U.S. Appl. No. 15/053,998.
U.S. Final Office Action dated Mar. 8, 2018 issued in U.S. Appl. No. 15/053,998.
U.S. Office Action dated Jul. 2, 2018 issued in U.S. Appl. No. 15/053,998.
U.S. Notice of Allowance dated Oct. 31, 2018 issued in U.S. Appl. No. 15/053,998.
International Search Report and Written Opinion dated Jun. 1, 2016 issued in PCT/US2016/019855.
International Preliminary Report on Patentability dated Sep. 8, 2017 issued in PCT/US2016/019855.
European Extended Search Report dated Aug. 2, 2018 issued in EP 18162501.3.
Czinger, et al. [US Provisional Patent Application filed Jul. 2, 2014] entitled "Systems and Methods for Fabricating Joint Members".
ATK an Advanced Weapon and Space Systems Company, "CCAT ATK Composite Strut Study Final Report," Dec. 13, 2010, 69 pages.
Kohta et al., "A design method for optimal truss structures with certain redundancy C3. based on combinatorial rigidity theory," 10th World Congress on Structural and Multidisciplinary Optimization, May 19-24, 2013, Orlando, FL., 10 pages.
Li et al., "Truss topology optimization with species conserving genetic algorithm," IEEE, 2014, 7 pages.
Matsuo, et al. "Optimization of elastically deformed gridshell with partially released joints," International Association for Shell and Spatial Structures (IASS), Apr. 2015, Tokyo, Japan, 7 pages.
U.S. Appl. No. 15/336,541, filed Oct. 27, 2016, Freestone et al.
U.S. Office Action dated Oct. 16, 2018 issued in U.S. Appl. No. 15/336,541.
U.S. Notice of Allowance dated Feb. 27, 2019 issued in U.S. Appl. No. 15/336,541.
U.S. Notice of Allowance dated May 1, 2019 issued in U.S. Appl. No. 15/336,541.
U.S. Office Action dated Sep. 5, 2019 issued in U.S. Appl. No. 15/480,276.
U.S. Notice of Allowance dated Jan. 8, 2020 issued in U.S. Appl. No. 15/336,541.
European Office Action dated Feb. 6, 2020 issued in EP 18162501.3.

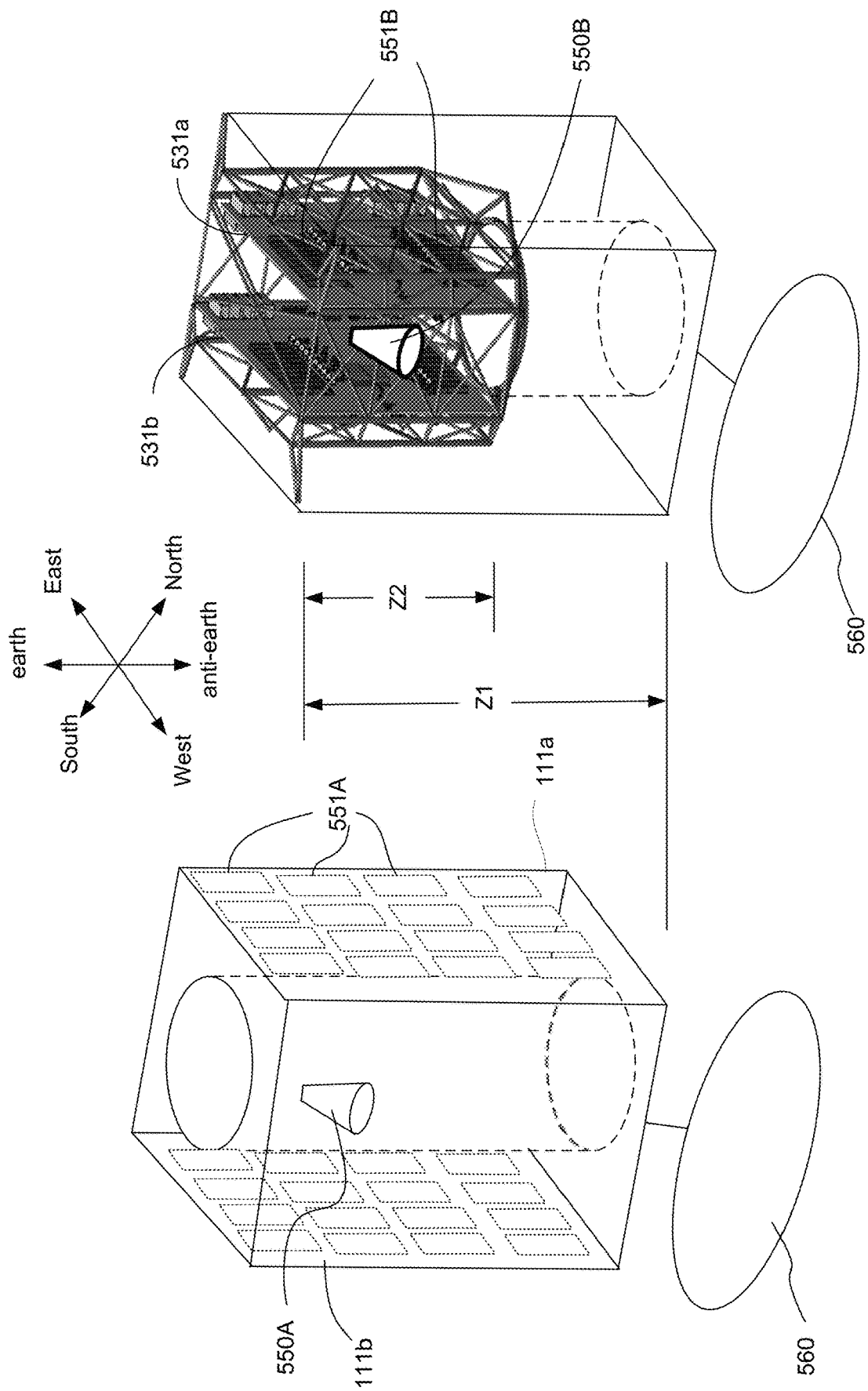

SPACECRAFT EXOSKELETON TRUSS STRUCTURE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes. This application is also related to U.S. Pat. Nos. 10,227,145 and/or 10,112,731 which are assigned to the assignee of the present disclosure, and incorporated into the present application by reference in their entireties.

TECHNICAL FIELD

This invention relates generally to a spacecraft structure, and more particularly to an exoskeleton truss structure which supports equipment and radiator panels.

BACKGROUND

The assignee of the present invention manufactures and deploys spacecraft for, inter alia, communications and broadcast services. Such spacecraft may include a large variety of payload equipment (e.g., electronics, antennas, antenna feeds, imaging systems) and bus equipment (e.g., propulsion equipment, attitude control electronics, sensors and actuators, solar arrays and batteries) mechanically coupled with a spacecraft structural support system. The spacecraft structural support system may be required to sustain large loads during launch, to experience large daily temperature excursions during the spacecraft's lifetime, and may be required to maintain precise respective alignment of various components mounted thereon. Such spacecraft conventionally dispose heat dissipating equipment, particularly communications payload electronics, on interior surfaces of radiator panels ("sidewalls") that are configured to be oriented, on orbit, in a north or south direction (i.e., orthogonal to the spacecraft Y(pitch) axis), the exterior surfaces of the radiator panels having a view of space. FIG. 1 shows an example of a conventional spacecraft undergoing an assembly process wherein North radiator panel 111*a* and South radiator panel 111*b* are shown ready to be mated to a main body structure 110 including a central cylinder 120. An additional equipment panel 112 is transverse to the North radiator panel 111*a* and the South radiator panel 111*b* and may be thermally coupled therewith by way of heat pipes 115. In a launch configuration, the North radiator panel 111*a* and South radiator panels 111*b* are disposed parallel to the launch vehicle velocity vector and may be referred to as being in a vertical orientation. In the launch configuration, Equipment panel 112 is disposed transverse to the launch vehicle velocity vector and may be referred to as being in a horizontal orientation.

FIG. 2 illustrates another example of a conventional spacecraft, as described in U.S. Pat. No. 5,839,696, including North radiator panel 34 and South radiator panel 36. The radiator panels include heat dissipating equipment 38, and are also thermally coupled to the transverse equipment panels 44 by way of heat pipes 46.

SUMMARY

The presently disclosed techniques relate to spacecraft structure that includes an exoskeleton truss structure which supports internal equipment panels and external radiator panels, and mechanically couples the panels with a structural interface adapter for mating to a launch vehicle According to some implementations, a spacecraft includes a structural interface adapter for mating to a launch vehicle, at least one radiator panel, at least one equipment panel, a first 3-D truss structure proximal to and mechanically coupled with the structural interface adapter, and a second 3-D truss structure distal from the structural interface adapter and coupled mechanically with the structural interface adapter by way of the first 3-D truss structure. The at least one equipment panel and the at least one radiator panel is coupled mechanically by one or both of the first 3-D truss structure and the second 3-D truss structure with the structural interface adapter. Each 3-D truss structure includes at least four coupling nodes and at least six strut elements, attached together by a respective plurality of joints, each strut element disposed between and attached with a respective pair of the plurality of coupling nodes.

In some examples, the spacecraft may further include ring clamps, wherein the first truss structure and the second truss structure are detachably joined together by the ring clamps.

In some examples, the spacecraft may further include a propulsion module that includes the first truss structure and an antenna module that includes the second truss structure where the propulsion module includes at least one propellant tank mechanically coupled with the first truss structure and the antenna module includes at least one antenna reflector mechanically coupled with the second truss structure. In some examples, the spacecraft may further include a repeater module including electrical payload equipment thermally coupled with the at least one radiator panel and disposed on the at least one equipment panel or on the at least one radiator panel. In some examples, the spacecraft may further include an avionics module including a third 3-D truss structure, wherein the avionics module includes avionics equipment mechanically coupled with the third truss structure. In some examples the spacecraft may further include a plurality of ring clamps, where the first truss structure and the third truss structure are detachably joined together by a first portion of the plurality of ring clamps, and the second truss structure and the third truss structure are detachably joined together by a second portion of the plurality of ring clamps. In some examples, the avionics module may be disposed between the propulsion module and the antenna module. In some examples, the second 3-D truss structure may be coupled mechanically with the structural interface adapter by way of the first 3-D truss structure and the third 3-D truss structure. In some examples, the first 3-D truss structure may be structurally coupled with the second 3-D truss structure only by way of the third 3-D truss structure. In some examples, the spacecraft may further include a repeater module including electrical payload equipment. In some examples, a proximal portion of the repeater module may be proximate to a distal portion of the avionics module and a distal portion of the repeater module is proximate to a proximal portion of the antenna module. In some examples, the distal portion of the repeater module may be located at a first distance from the structural interface adapter, the proximal portion of the antenna module may be located at a second distance from the structural interface adapter, and the first distance may be greater than the second distance.

In some examples, the at least one equipment panel may be thermally coupled with the at least one radiator panel by heat pipes.

In some examples, each truss structure may be configured to be fabricated by forming a dry fit assembly of the plurality of coupling nodes and the plurality of strut elements, the dry fit assembly being self-supporting, aligning the dry fit assembly; and rigidizing each joint. In some examples, the dry fit assembly may include one or more dry fitted joints configured to resist gravitational forces and incidental contact, and to yield to a persistently applied force in the range of about 5-30 pounds. In some examples, rigidizing each joint may include affixing each joint with an adhesive.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which:

FIGS. 5A and 5B provide a comparison of a satellite configuration in the absence of the present teachings with a satellite configuration incorporating an exoskeleton truss structure.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or interveninge feature s may be present. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The present disclosure contemplates a spacecraft that includes one or more interior equipment panels and one or more separate exterior radiator panels, the interior equipment panels and the exterior radiator panels being coupled mechanically by a 3-D truss structure with a structural interface adapter of the spacecraft that is configured to mate to a launch vehicle. In some implementations, all or a substantial portion of heat dissipating components, particularly payload electronics, are disposed on the interior, non-radiating, equipment panels. The internal equipment may be a thermally coupled with the external radiator panels by way of, for example, heat pipes that couple the interior equipment panels and the exterior radiator panels.

The truss structure may be a thermally stable exoskeleton configured as a truss-like frame structure that includes a number of coupling fittings ("coupling nodes" or "nodes") connected by strut elements. In some implementations, the truss structure may incorporate features disclosed in U.S. Pat. Nos. 10,227,145 and/or 10,112,731 which are assigned to the assignee of the present disclosure, and incorporated into the present application by reference in their entireties. The nodes may be formed by additive manufacturing and/or compression molding techniques, for example. The strut elements may include graphite tube members having a low coefficient of thermal expansion.

Figure 1:
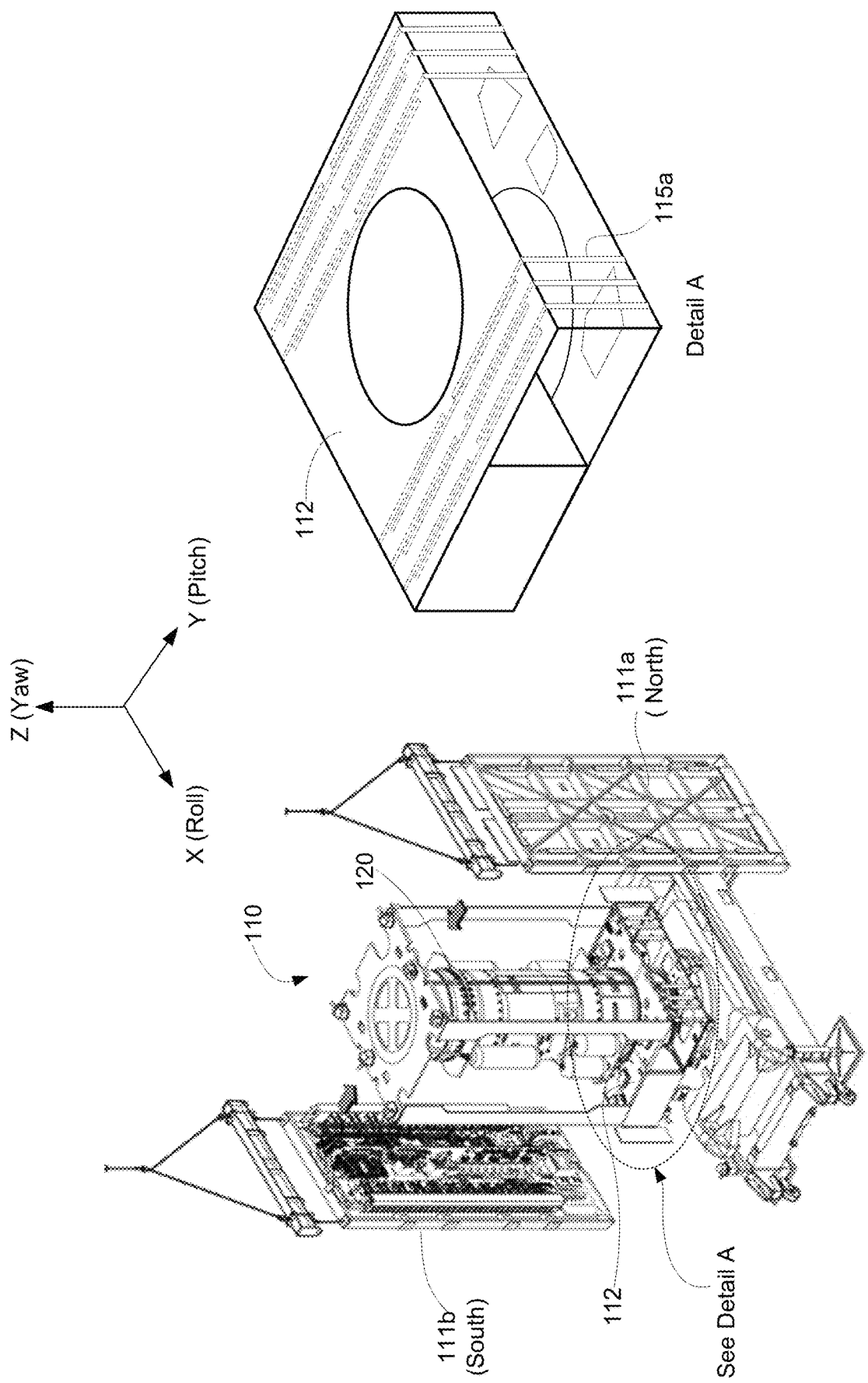
FIG. 1 shows an example of a conventional spacecraft undergoing an assembly process.
Figure 2:
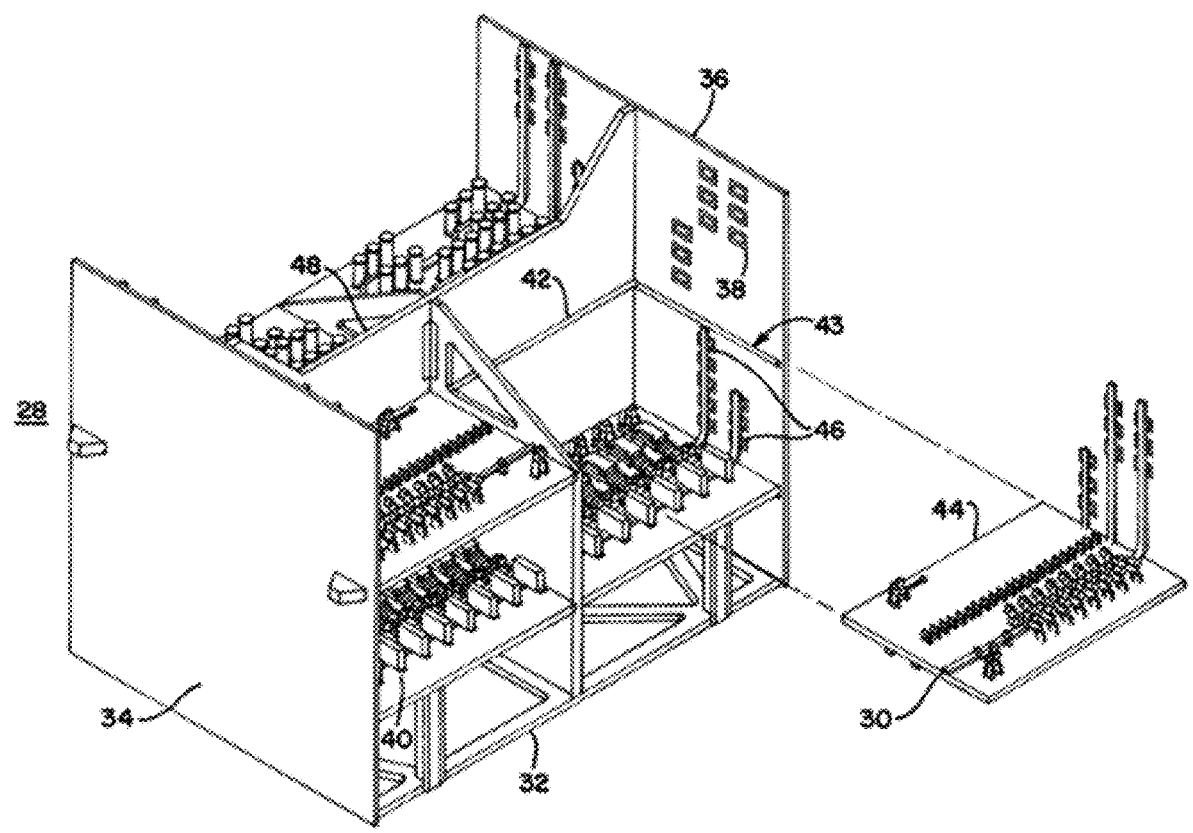
FIG. 2 illustrates another example of a conventional spacecraft.
Figure 3A:
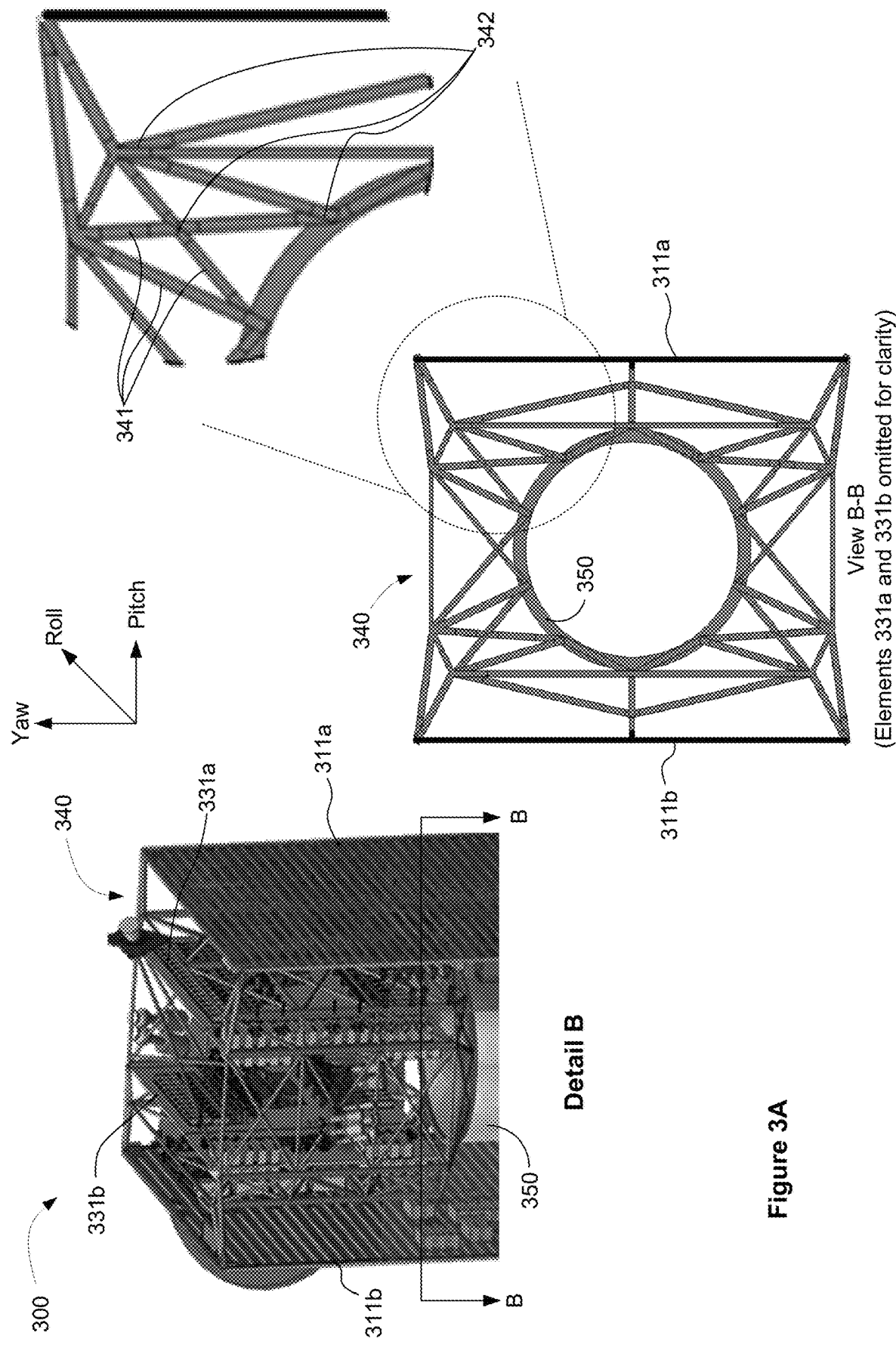
FIGS. 3A-3B illustrate features of a spacecraft, according to an implementation.
Figure 3B:
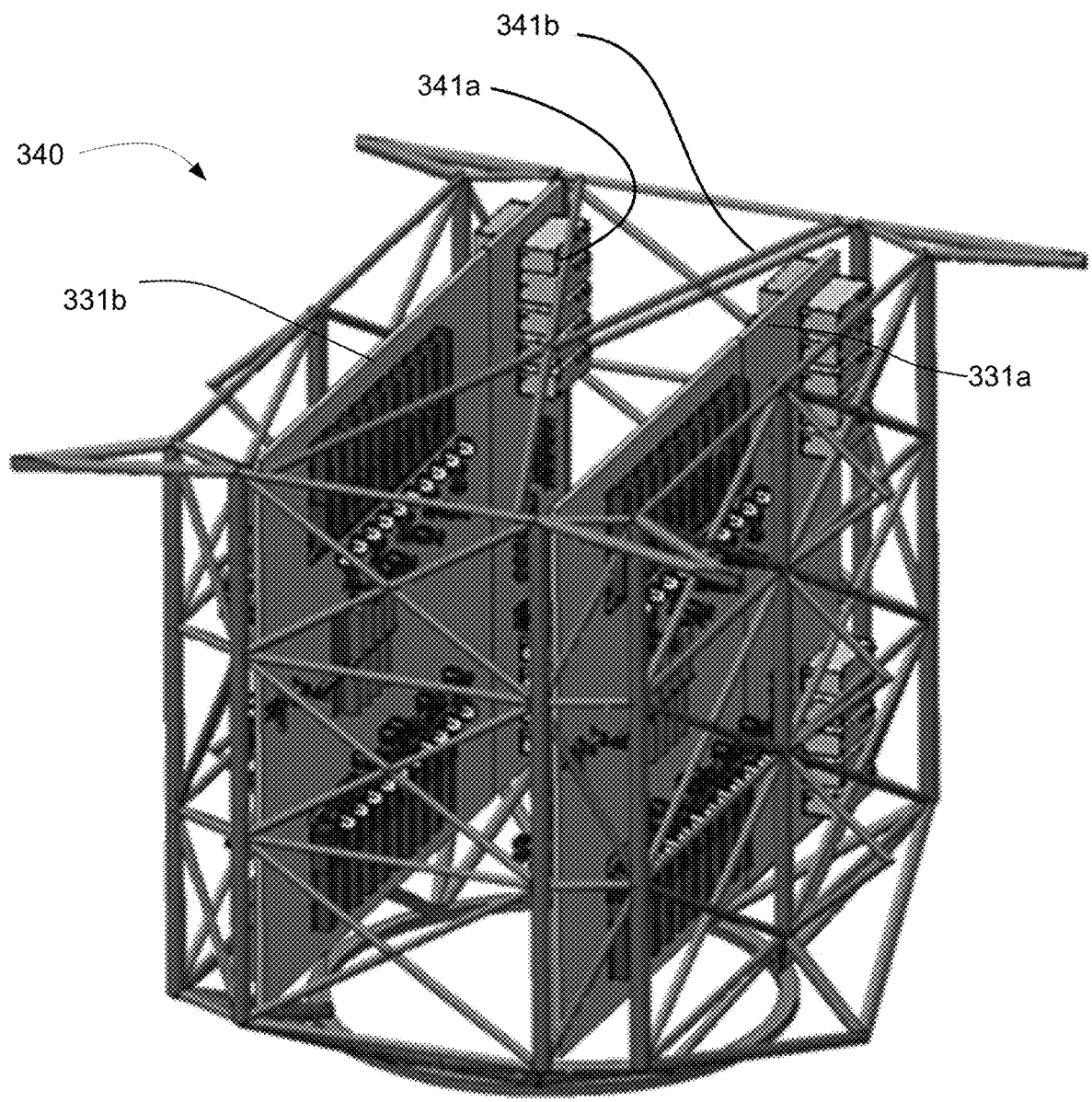

FIGS. 3A-3B illustrate features of a spacecraft, according to an implementation. Referring first to Detail A of FIG. 3A, a partially cutaway perspective view of a spacecraft 300 is depicted. In the illustrated implementation, a structural interface adapter 350, which may be configured for mating with a launch vehicle payload adapter (not illustrated), is mechanically coupled with a 3-D truss structure 340. The 3-D truss structure 340 is in turn mechanically coupled with exterior radiator panels 311a and 311b and interior equipment panels 331a and 331b.

As may be better observed in View B-B, the truss structure 340 may include a number of strut elements 341 and coupling nodes 342. Each strut element 341 may be mechanically mated with a pair of coupling nodes 342. In some implementations, the strut element 341 may be a thin-walled structural member fabricated, for example, from a carbon composite material such as graphite fiber reinforced polymer (GFRP). Each coupling node has at least two protrusions, or "legs", each leg being configured to mate with an end portion of a strut element. In some implementations, each strut element is attached at a first end with a first leg of a first coupling node and is attached at a second end with a second leg of a second coupling node, the first leg being substantially longer than the second leg.

Advantageously, joints between coupling nodes and strut elements may be configured such that a dry fitted assembly of all or a portion of the truss structure is self-supporting, i.e., the joints are configured such that contact friction at the joints is sufficient to resist gravitational forces and incidental contact. The joints may further be configured to yield to a persistently applied manual force. For example, the frictional forces may be such that an applied load in the range of about 5-30 pounds may be necessary and sufficient to overcome contact friction. Because the dry fit assembly is self-supporting and yet capable of manual adjustment for alignment purposes, joints between the strut elements and coupling nodes may be rigidized only when desired, for example after final alignment at the structure assembly level.

The truss structure 340 may be configured to support the equipment and radiator panels, as well as antenna components such as feed elements and other equipment (not illustrated). The truss structure 340 may provide the primary load path between the structural interface adapter 350 on the one hand and, on the other hand, the interior equipment panels 331, the exterior radiator panels 311, the antenna components and the other equipment. The structural interface adapter 350 may provide, in a launch configuration, the primary load path between a launch vehicle and the truss structure 340.

In some implementations, payload electronics are disposed on both sides of interior equipment panels 331*a* and 331*b*. Each interior equipment panels 331*a* and 331*b* may be thermally coupled by way of heat pipes (not illustrated) with one or both external radiator panels 311*a* and 311*b*. The external radiator panels 311*a* and 311*b* may, in an on-orbit configuration, be North/South facing panels (i.e., orthogonal to the spacecraft pitch axis). In the illustrated implementation, the interior equipment panels 331*a* and 331*b* are substantially parallel with the external radiator panels 311*a* and 311*b*; however any orientation of the interior equipment panels 331*a* and 331*b* may be contemplated by the presently disclosed techniques.

In a launch configuration, the interior equipment panels 331*a* and 331*b* and the external radiator panels 311*a* and 311*b* may be disposed parallel to the launch vehicle velocity vector (i.e., vertically oriented). Referring now to FIG. 3B, At least a first portion of the truss structure 340 may be disposed outboard of the interior equipment panel 331*a*. At least a second portion of the truss structure 340 may be disposed outboard of the interior equipment panel 331*b*. Hence, the term exoskeleton has been used herein to denote that at least a substantial portion of the truss structure 340 is outboard of (or exterior with respect to) the interior equipment panels.

Because all or a substantial portion of heat dissipating electronics equipment are disposed on the interior equipment panels 311*a* and 311*b*, a reduction in mass of spacecraft sidewalls may be achieved, in some implementations. For example, spacecraft sidewalls disposed on east-west faces of the spacecraft (i.e., orthogonal to the roll axis) and Earth anti-earth faces of the spacecraft (i.e., orthogonal to the yaw axis) may be configured as lightweight, non-load bearing, radiation-shielding panels.

Referring still to FIG. 3B, a view of truss structure 340 and interior equipment panels 331*a* and 331*b* is presented. For clarity of illustration, external radiator panels 311*a* and 311*b* and structural interface adapter 350 are omitted from FIG. 3B. The present disclosure contemplates that all or a substantial portion of the truss structure 340 may be assembled prior to installation of the interior equipment panels 331*a* and 331*b*. For example, in the illustrated implementation, only the strut elements 341*a* and 341*b* are contemplated to be assembled to the truss structure 340 subsequent to installation of the interior equipment panels 331*a* and 331*b*. In some implementations, the interior equipment panels 331*a* and 331*b* may be supported by flexures (not illustrated) extending from selected ones of the coupling nodes 342.

Advantageously, the truss structure 340 includes a substantial amount of spatial volumes (open spaces) within which payload components (travelling wave tube amplifiers (TWTAs), output multiplexers (OMUXs), switches, filters, etc) may be disposed. The disclosed truss structure 340 provides a mass efficient structure for supporting waveguides and heat pipes, in addition to the equipment panels and radiator panels, and provides a high degree of open volume (transparency) through which waveguides and heat pipes may be routed.

Figure 4:
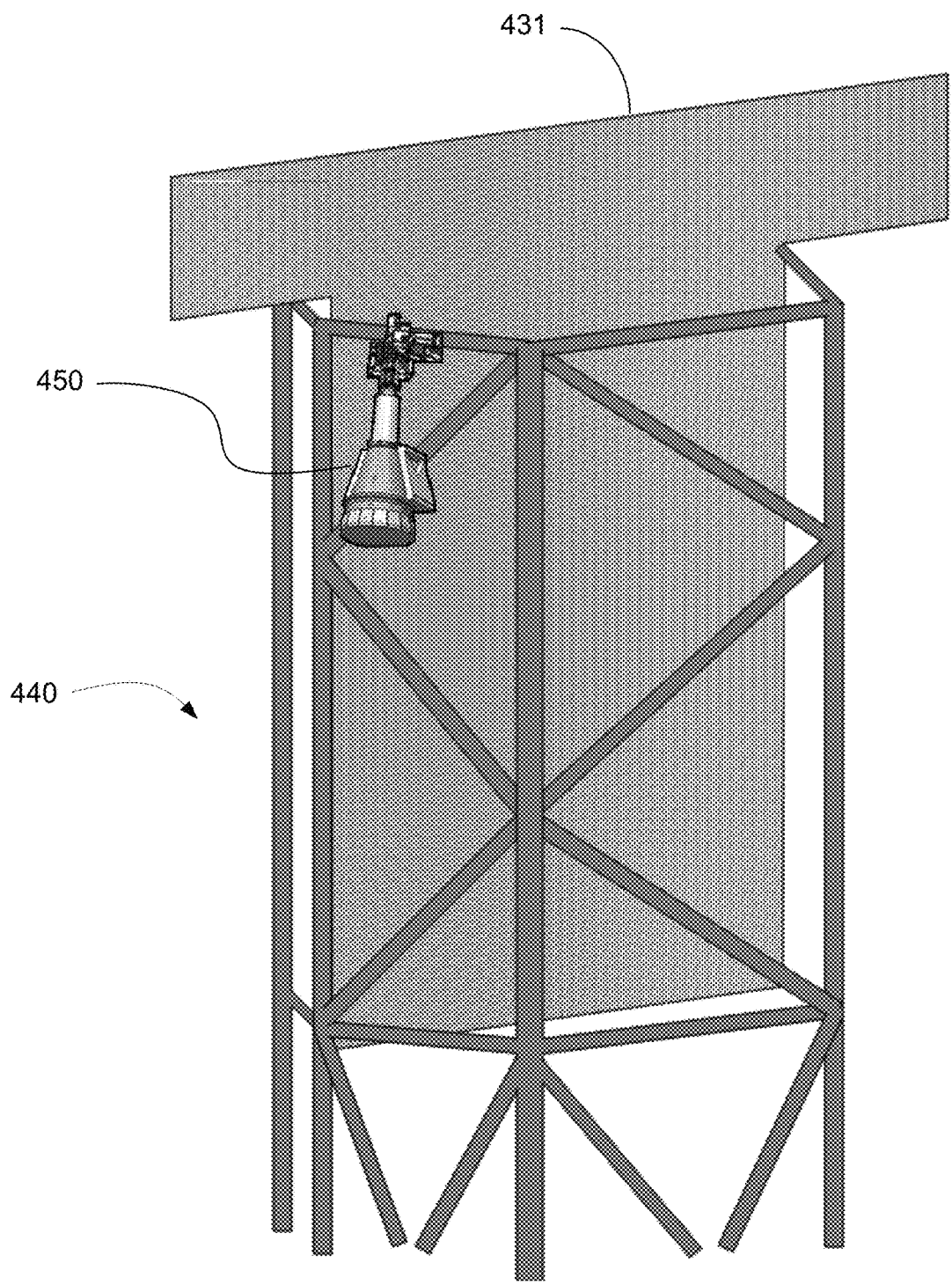
FIG. 4 illustrates a truss structure according to an implementation.

FIG. 4 illustrates a truss structure according to an implementation. In the illustrated implementation, a truss structure 440 is mechanically coupled with interior equipment panel 431 and feed element 450. Feed element 450 may be aligned to illuminate an antenna reflector (not illustrated). A truss structure assembled according to the presently disclosed techniques, particularly where the strut elements are formed using a carbon composite material such as GFRP, may be expected to have excellent mechanical properties, particularly a desirably high degree of stiffness (bending mode first fundamental frequency greater than 9 Hz) and a desirably low coefficient of thermal expansion (less than about 1 to 5 $\mu m/^\circ$ C.). As a result, the truss structure 440 may advantageously be used as a mounting frame for components such as feed element(s) 450 and optical sensors, for example, that require highly accurate alignment.

A further advantage of the presently disclosed techniques may be obtained by referring to FIGS. 5A and 5B which provide a comparison of a satellite configuration in the absence of the present teachings (FIG. 5A) with a satellite configuration incorporating an exoskeleton truss structure which supports internal equipment panels and external radiator panels (FIG. 5B). Referring first to FIG. 5A, it may be observed that North/South radiator panels 111*a* and 111*b* each support a plurality of heat dissipating electronic components 551A. The heat dissipating components 151 are distributed so as to fully populate the North/South radiator panels 111*a* and 111*b*. Referring now to FIG. 5B, heat dissipating electronic components 551B may be distributed on both sides of each of internal equipment panel 531 *a* and 530 1B. As a result, a height Z1 of the radiator panels may be as much as two times greater than a height Z2 of the interior equipment panels. Consequently, the configuration illustrated in FIG. 5B permits the heat dissipating electronic components 551B to be clustered generally closer to the earth facing portion of the spacecraft. Because feed element 550 is preferably disposed close to the earth facing portion of the spacecraft (i.e., a substantial distance from antenna reflector 560), an average waveguide line length between the heat dissipating electronic compliments 551B and feed element 550B (FIG. 5B) is considerably smaller than an average waveguide line length between the heat dissipating electronic components 550A and feed element 550A (FIG. 5A). Moreover, the present techniques provide more flexibility for optimizing the location of payload electronics such as multiplexers so as to be closer to respective RF feed elements. As result, waveguide line losses may be substantially reduced and overall payload efficiency may be improved. In addition, the presently disclosed techniques increase the amount of mounting area available on panels disposed parallel to the yaw axis and reduce or eliminate a need to mount equipment on panels transverse to the yaw axis. This may be advantageous during ground test operations, for example, because all heat pipes can be simultaneously oriented in a horizontal orientation.

Figure 6A:
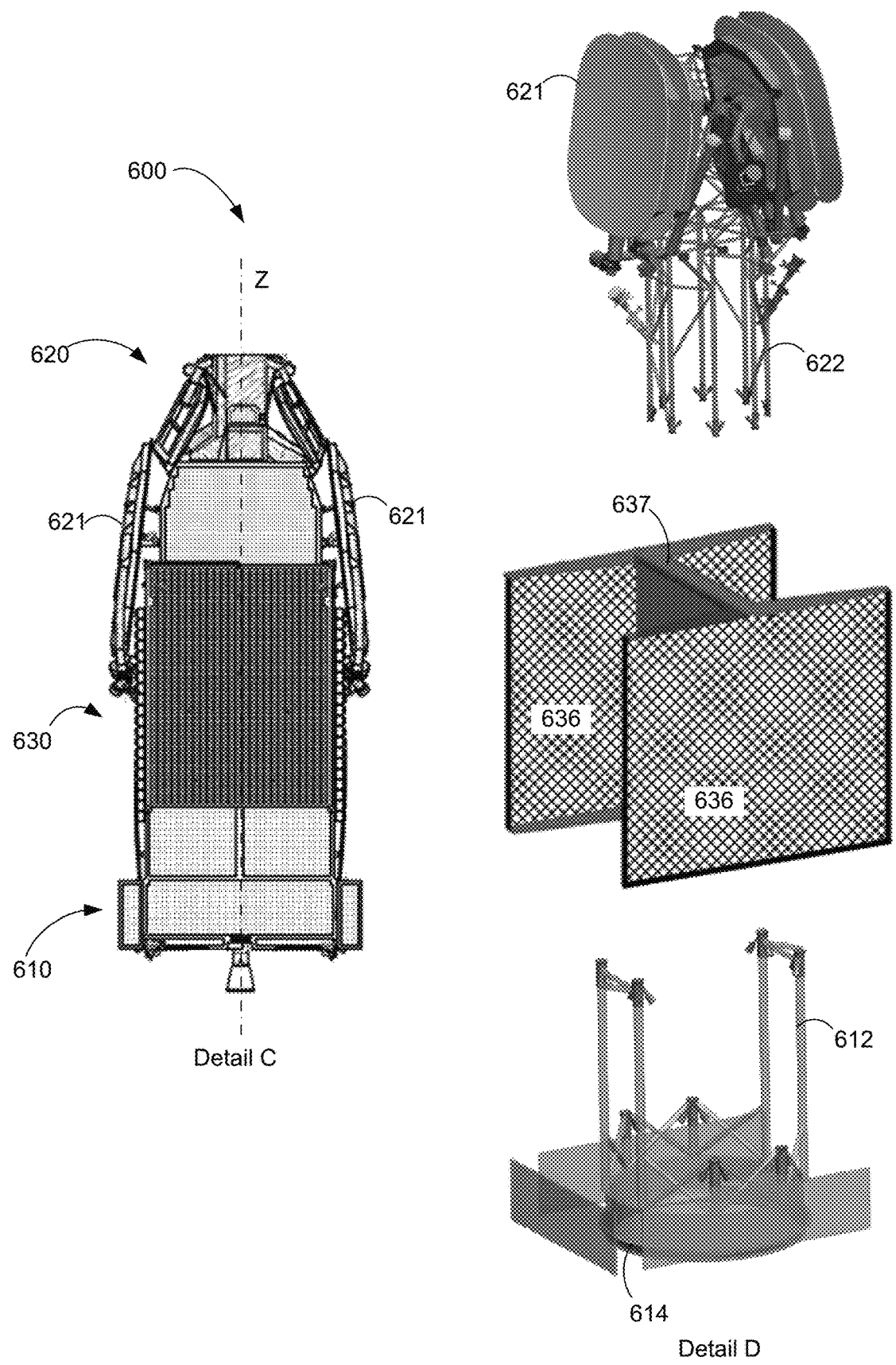
FIGS. 6A-6B illustrate features of a spacecraft, according to an implementation.

In some implementations, spacecraft modularity is increased by configuring the spacecraft to include at least two 3-D truss structures. Each 3-D truss structure may be detachably coupled together, so as to facilitate separate and parallel integration and test activities of separate modules for example. Referring to FIG. 6A, spacecraft 600 is shown, in Detail C, in a fully integrated configuration. A lower (or aft) portion 610 of the spacecraft 600 includes a structural interface adapter configured to mate to a launch vehicle (not illustrated). An upper (or forward) portion 620 of the spacecraft 600 includes a plurality of antenna reflectors 621. An intermediate portion 630 of the spacecraft 600 may include, for example, one or more equipment panels and radiator panels, as well as heat dissipating equipment disposed thereon, including payload electronics.

Advantageously, the spacecraft 600 may be configured to include three or more distinct modular assemblies ("modules"). Detail D presents an exploded view of the spacecraft 600 in which certain external facing surfaces are omitted in in order to more clearly illustrate internal structural features. More particularly, the lower portion 610 is shown to include a first 3-D truss structure 612 proximal to and mechanically coupled with a structural interface adapter 614. The upper portion 620 is shown to include a second 3-D truss structure 622. Each 3-D truss structure includes at least four coupling nodes and at least six strut elements, attached together by a respective plurality of joints, each strut element disposed between and attached with a respective pair of the plurality of coupling nodes.

Referring still to Detail D, the intermediate portion 630 is shown to include two radiator panels 636, coupled with an equipment panel 637 disposed transversely to the radiator panels 636. It will be appreciated that spacecraft equipment (not illustrated), including payload electronics, for example, may be disposed on the radiator panels 636 and the equipment panel 637. When the lower portion 610, the upper portion 620, and the intermediate portion 630 are integrated together (in the configuration illustrated in Detail C, for example), the equipment panel 637 and the radiator panels 636 may be coupled mechanically with the structural interface adapter 614 only by way of one or both of the first 3-D truss structure 612 and the second 3-D truss structure 622. Advantageously, a direct structural coupling may be provided between the first 3-D truss structure 612 and the second 3-D truss structure 622 such that launch acceleration loads associated with the mass of the upper portion 620 are carried by the first 3-D truss structure 612 and are not transmitted through the intermediate portion 630.

In some implementations, as will be described hereinbelow, a detachable mechanical fitting, such as a ring clamp for example, may be configured to mechanically couple the first 3-D truss structure 612 with the second 3-D truss structure 622.

In some implementations, the lower portion 610 may be configured as a propulsion module that includes the first truss structure 612 and at least one propellant tank (not illustrated) mechanically coupled with the first truss structure 612. The upper portion 620 may be configured as an antenna module that includes the second truss structure 622 and at least one antenna reflector 621 mechanically coupled with the second truss structure 622.

In some implementations, the intermediate portion 630 may be configured as a repeater module that includes electrical payload equipment (not illustrated). Some of the electrical payload equipment may be thermally coupled with one or both of the radiator panels 636. Some of the electrical payload equipment may be disposed on the equipment panel 637 and some of the electrical payload equipment may be disposed on the radiator panels 636.

Figure 6B:
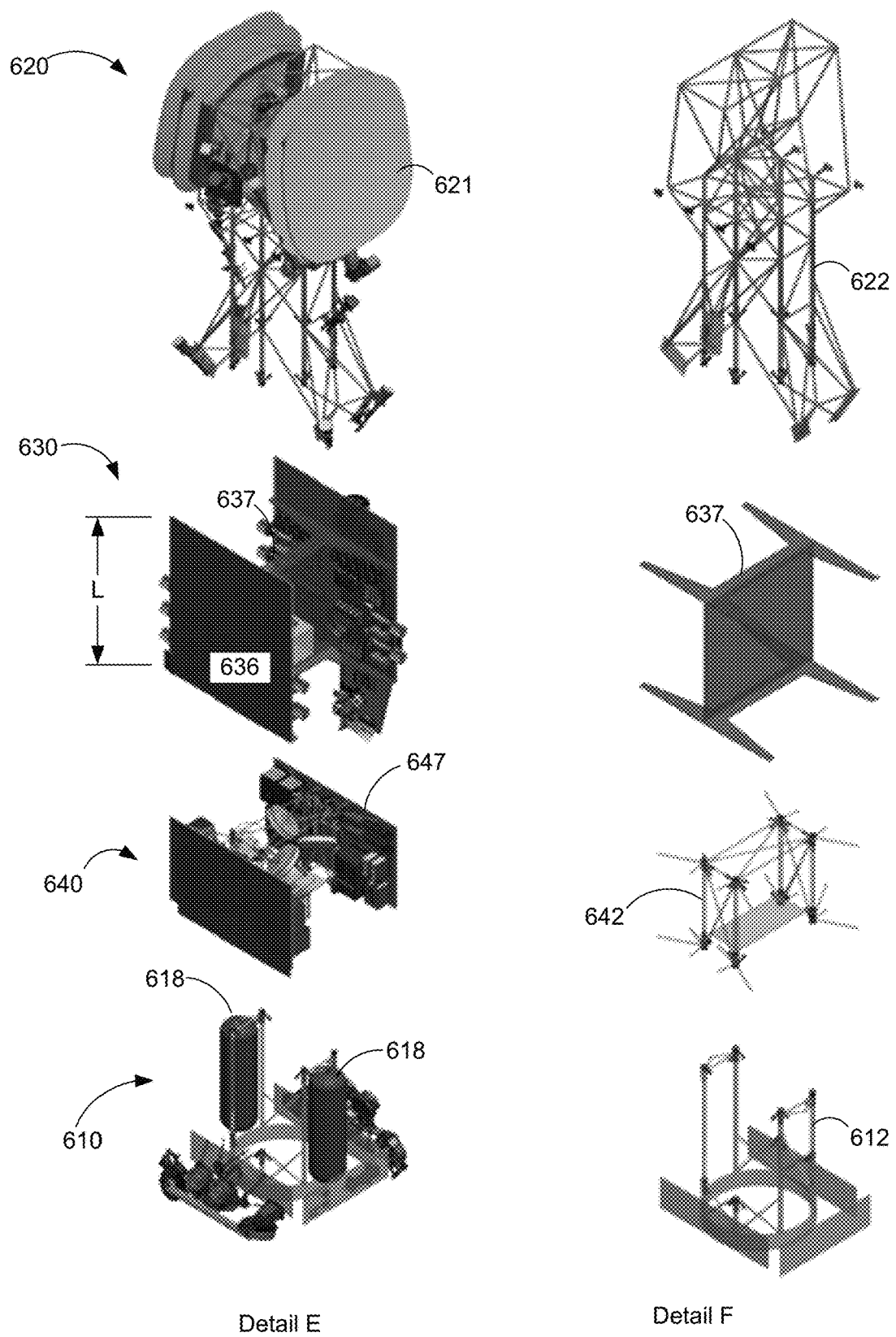

FIG. 6B depicts exploded views of the spacecraft 600, according to some implementations. In the illustrated example, as shown in Detail E, an avionics module 640 is disposed between the intermediate portion 630 and the lower portion 610. The avionics module 640 may include avionics equipment and/or other bus equipment such as attitude control electronics, reaction wheels, momentum wheels, batteries and power control electronics that are mechanically coupled with a third 3-D truss structure 642 (Detail F). Some of the equipment may be mechanically coupled directly with the third 3-D truss structure 642, and some may be mounted to an equipment panel 647 (Detail E) that is mechanically coupled with the third 3-D truss structure 642.

Detachable mechanical fittings, such as ring clamps for example, may be configured to detachably join the first 3-D truss structure 612 with the third 3-D truss structure 642; similarly, ring clamps may be configured to detachably join the second 3-D truss structure 622 with the third 3-D truss structure 642.

Advantageously, the avionics module 640 is disposed between the lower portion 610, configured as a propulsion module including propellant tanks 618, and the upper portion 620, configured as an antenna module. In the illustrated example, the avionics module 640 is also disposed between the lower portion 610, configured as the propulsion module and the intermediate portion 630, configured as a repeater module.

In some implementations, the second 3-D truss structure 622 is coupled mechanically with the structural interface adapter by way of the first 3-D truss structure 612 and the third 3-D truss structure 642. In some implementations, the first 3-D truss structure 612 is structurally coupled with the second 3-D truss structure 622 only by way of the third 3-D truss structure 642.

In some implementations, a proximal (aft or lower) portion of the repeater module is proximate to a distal (forward or upper) portion of the avionics module, whereas a distal (forward or upper) portion of the repeater module is proximate to the antenna module. The distal portion of the repeater module may be located at a first distance from the structural interface adapter, and a proximal portion of the antenna module may be located at a second distance from the structural interface adapter such that the first distance is greater than the second distance. In other words, along the longitudinal axis Z (Detail C) there may be a substantial overlap between at least the lower portion of the antenna module and the repeater module. For example, lower members of the second 3-D truss structure 622 may extend through a portion or the entirety of longitudinal length L (Detail E) of the repeater module. As a result, the second 3-D truss structure 622 may be configured to be detachably coupled directly with one or both of the first 3-D truss structure 612 and the third 3-D truss structure 642.

In some implementations, the equipment panel 637 may be thermally coupled with the at least one radiator panel by heat pipes.

As described hereinabove, one or more of the 3-D truss structures 612, 622 and 642 may be configured to be fabricated by forming a dry fit assembly of the plurality of coupling nodes and the plurality of strut elements, the dry fit assembly being self-supporting; aligning the dry fit assembly; and rigidizing each joint. The dry fit assembly may include one or more dry fitted joints configured to resist gravitational forces and incidental contact, and to yield to a persistently applied force in the range of about 5-30 pounds. In some implementations, rigidizing each joint includes affixing each joint with an adhesive.

Figure 7:
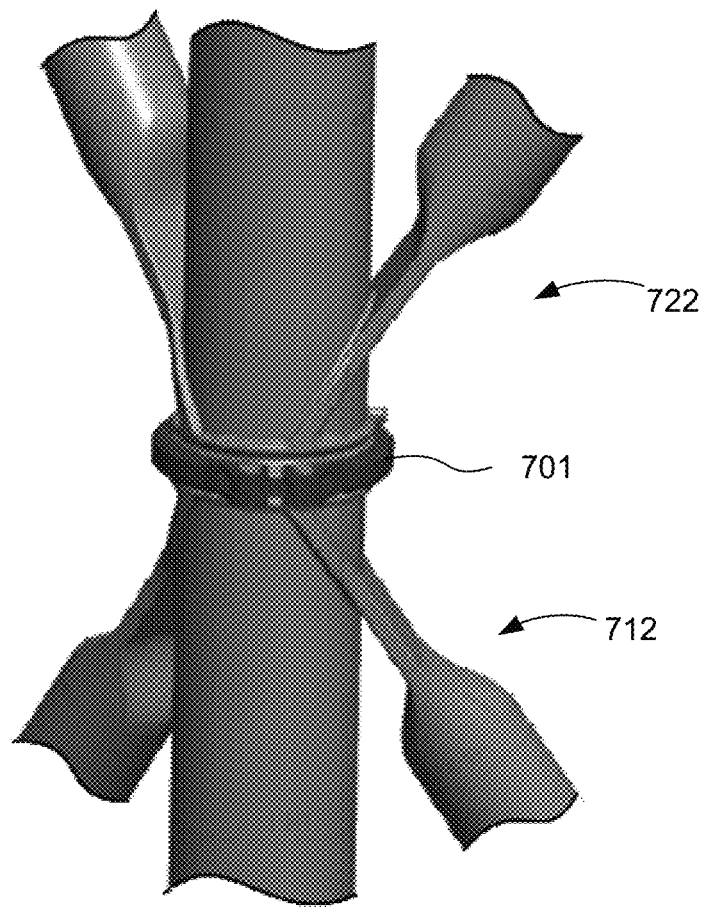
FIG. 7, illustrates an example of a lower portion of an upper 3-D truss structure, according to an implementation.

As indicated above, detachable mechanical fittings may be configured to mechanically couple one 3-D truss structure another 3-D truss structure. An example implementation is illustrated in FIG. 7, which depicts a lower portion of an upper 3-D truss structure 722 being detachably coupled with an upper portion of a lower 3-D truss structure by way of ring clamp 701.

Thus, a spacecraft exoskeleton truss structure has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
   a structural interface adapter for mating to a launch vehicle;
   at least one radiator panel;
   at least one equipment panel;
   a first 3-D truss structure proximal to and mechanically coupled with the structural interface adapter; and
   a second 3-D truss structure distal from the structural interface adapter and coupled mechanically with the structural interface adapter by way of the first 3-D truss structure; wherein the at least one equipment panel and the at least one radiator panel is coupled mechanically by one or both of the first 3-D truss structure and the second 3-D truss structure with the structural interface adapter; and
   each 3-D truss structure includes at least four coupling nodes and at least six strut elements, attached together by a respective plurality of joints, each strut element disposed between and attached with a respective pair of the plurality of coupling nodes.

2. The spacecraft of claim 1, further comprising ring clamps, wherein the first 3-D truss structure and the second 3-D truss structure are detachably joined together by the ring clamps.

3. The spacecraft of claim 1, wherein the at least one equipment panel is thermally coupled with the at least one radiator panel by heat pipes.

4. The spacecraft of claim 1, further comprising:
   a propulsion module that includes the first truss structure; and
   an antenna module that includes the second truss structure; wherein
   the propulsion module includes at least one propellant tank mechanically coupled with the first truss structure; and
   the antenna module includes at least one antenna reflector mechanically coupled with the second truss structure.

5. The spacecraft of claim 4, further comprising a repeater module including electrical payload equipment thermally coupled with the at least one radiator panel and disposed on the at least one equipment panel or on the at least one radiator panel.

6. The spacecraft of claim 4, further comprising an avionics module including a third 3-D truss structure, wherein the avionics module includes avionics equipment mechanically coupled with the third 3-D truss structure.

7. The spacecraft of claim 6, further comprising a plurality of ring clamps, wherein:
   the first truss structure and the third truss structure are detachably joined together by a first portion of the plurality of ring clamps; and
   the second truss structure and the third truss structure are detachably joined together by a second portion of the plurality of ring clamps.

8. The spacecraft of claim 7, wherein the avionics module is disposed between the propulsion module and the antenna module.

9. The spacecraft of claim 7, wherein the second 3-D truss structure is coupled mechanically with the structural interface adapter by way of the first 3-D truss structure and the third 3-D truss structure.

10. The spacecraft of claim 7, wherein the first 3-D truss structure is structurally coupled with the second 3-D truss structure only by way of the third 3-D truss structure.

11. The spacecraft of claim 7, further comprising a repeater module including electrical payload equipment.

12. The spacecraft of claim 11, wherein a proximal portion of the repeater module is proximate to a distal portion of the avionics module and a distal portion of the repeater module is proximate to a proximal portion of the antenna module.

13. The spacecraft of claim 12, wherein, the distal portion of the repeater module is located at a first distance from the structural interface adapter, the proximal portion of the antenna module is located at a second distance from the structural interface adapter, and the first distance is greater than the second distance.

14. The spacecraft of claim 1, wherein each 3-D truss structure is configured to be fabricated by:
   forming a dry fit assembly of a plurality of coupling nodes and a plurality of strut elements, the dry fit assembly being self-supporting;
   aligning the dry fit assembly; and
   rigidizing each joint.

15. The spacecraft of claim 14, wherein the dry fit assembly includes one or more dry fitted joints configured to resist gravitational forces and incidental contact, and to yield to a persistently applied force in the range of about 5-30 pounds.

16. The spacecraft of claim 14, wherein rigidizing each joint includes affixing each joint with an adhesive.

* * * * *